US012535520B2

(12) United States Patent
Seo et al.

(10) Patent No.: US 12,535,520 B2
(45) Date of Patent: Jan. 27, 2026

(54) WAFER TYPE MEASURING APPARATUS AND MAGNETIC FLUX DENSITY MEASURING METHOD USING THE SAME

(71) Applicant: SEMES CO., LTD., Chungcheongnam-do (KR)

(72) Inventors: Yongjun Seo, Hwaseong-si (KR); Sujin Chae, Suwon-si (KR); Sanghyun Son, Busan-si (KR); Sangmin Ha, Hwaseong-si (KR); Youngsik Bang, Yongin-si (KR); Jeongmo Hwang, Ansan-si (KR); Dongok Ahn, Anyang-si (KR)

(73) Assignee: SEMES CO., LTD., Chungcheongnam-do (KR)

( * ) Notice: Subject to any disclaimer, the term of this patent is extended or adjusted under 35 U.S.C. 154(b) by 160 days.

(21) Appl. No.: 18/387,580

(22) Filed: Nov. 7, 2023

(65) Prior Publication Data
US 2024/0151767 A1    May 9, 2024

(30) Foreign Application Priority Data
Nov. 7, 2022   (KR) .................. 10-2022-0147380

(51) Int. Cl.
*G01R 31/28*   (2006.01)
(52) U.S. Cl.
CPC ................ *G01R 31/2831* (2013.01)
(58) Field of Classification Search
CPC ............ G01R 31/2831; G01R 33/00; G01R 33/0005; G01R 33/10; G01R 33/02;
(Continued)

(56) References Cited

U.S. PATENT DOCUMENTS 6,244,121 B1 *   6/2001   Hunter ............... H01L 21/681
73/866.5
7,289,230 B2   10/2007   Ramsey et al.
(Continued)

FOREIGN PATENT DOCUMENTS

JP      2003-50270     2/2003
KR      10-0936085     1/2010
(Continued)

OTHER PUBLICATIONS

Office Action dated May 28, 2024 for Korean Patent Application No. 10-2022-0147380 and its English translation provided by Google.
(Continued)

*Primary Examiner* — Son T Le
(74) *Attorney, Agent, or Firm* — WOMBLE BOND DICKINSON (US) LLP

(57) ABSTRACT

Provided are a wafer-type measuring apparatus capable of accurately measuring the magnetic flux density in a process chamber without opening the process chamber, and a magnetic flux density measuring method using the wafer-type measuring apparatus. The wafer-type measuring apparatus includes a wafer-type substrate, magnetic flux density sensors disposed on the wafer-type substrate and configured to measure a magnetic flux density, a power supply disposed on the substrate and configured to supply power to the magnetic flux density sensors, a microcontroller unit (MCU) disposed on the substrate and configured to signal process the measured magnetic flux density, and a wireless communication module disposed on the substrate and configured to transmit a signal from the MCU to the outside, and measure the magnetic flux density in a process chamber using a magnetic field.

19 Claims, 8 Drawing Sheets

(58) Field of Classification Search
CPC ............ G01R 33/0023; G01R 33/0094; G01R 35/007; H01J 37/244; G01B 21/08; G08C 17/02; H01L 21/67253; H01L 22/34; H02J 50/10
See application file for complete search history.

(56) References Cited

U.S. PATENT DOCUMENTS

| | | | |
|---|---|---|---|
| 2004/0007326 A1* | 1/2004 | Roche | H01J 37/32935 |
| | | | 118/712 |
| 2021/0112662 A1* | 4/2021 | Seo | H01L 21/67253 |
| 2022/0272801 A1 | 8/2022 | Kinzer | |

FOREIGN PATENT DOCUMENTS

| KR | 10-2148318 | 8/2020 |
|---|---|---|
| KR | 10-2021-0001481 A | 1/2021 |
| KR | 10-2022-0081866 | 6/2022 |
| KR | 10-2022-0097153 A | 7/2022 |

OTHER PUBLICATIONS

Office Action (2nd) dated Jan. 10, 2025 for Korean Patent Application No. 10-2022-0147380 and its English translation from Global Dossier.

* cited by examiner

WAFER TYPE MEASURING APPARATUS AND MAGNETIC FLUX DENSITY MEASURING METHOD USING THE SAME

CROSS-REFERENCE TO RELATED APPLICATION

This application is based on and claims priority under 35 U.S.C. § 119 to Korean Patent Application No. 10-2022-0147380, filed on Nov. 7, 2022, in the Korean Intellectual Property Office, the disclosure of which is incorporated by reference herein in its entirety.

BACKGROUND

1. Field

The inventive concept relates to a measuring apparatus, and more particularly, to a measuring apparatus for measuring the magnetic flux density in a process chamber and a measuring method using the measuring apparatus.

2. Description of the Related Art

Processes of manufacturing semiconductor devices include an ion implantation process, a growth and deposition process, an exposure process, an etching process, and the like, and plasma is widely used in these processes. A typical method for the etching process is a reactive ion etching (RIE) method using plasma. The RIE method is a physico-chemical etching method that combines a chemical reaction of radicals with a physical etching by ion collision, and has excellent selectivity and high throughput. Accordingly, the RIE method is a very important and widely used process technology in semiconductor processing. A magnetic field may be added to the RIE method to control the shape of plasma or induce rotational motion of electrons, thereby improving the etching performance.

SUMMARY

The inventive concept provides a wafer-type measuring apparatus capable of accurately measuring the magnetic flux density in a process chamber without opening the process chamber, and a magnetic flux density measuring method using the measuring apparatus.

In addition, the inventive concept is not limited to the above-mentioned, and other inventive concepts can be clearly understood by those skilled in the art from the description below.

Additional aspects will be set forth in part in the description which follows and, in part, will be apparent from the description, or may be learned by practice of the presented embodiments of the disclosure.

According to an aspect of the inventive concept, there is provided a wafer-type measuring apparatus including a wafer-type substrate, magnetic flux density sensors disposed on the substrate and configured to measure a magnetic flux density, a power supply disposed on the substrate and configured to supply power to the magnetic flux density sensors, a microcontroller unit (MCU) disposed on the substrate and configured to signal process the measured magnetic flux density, and a wireless communication module disposed on the substrate and configured to transmit a signal from the MCU to the outside, wherein the wafer-type measuring apparatus measures the magnetic flux density in a process chamber using a magnetic field.

In an embodiment, the substrate may include a printed circuit board (PCB) substrate, a silicon substrate, or a ceramic substrate.

In an embodiment, when the substrate is the PCB substrate, the magnetic flux density sensors, the power supply, and the wireless communication module may be placed in the form of a circuit in the PCB substrate, and when the substrate is the silicon substrate or the ceramic substrate, the magnetic flux density sensors, the power supply, and the wireless communication module may be fabricated as a separate PCB circuit film, to form a structure in which the PCB circuit film is bonded to the substrate.

In an embodiment, the magnetic flux density sensors may be arranged in a radial array structure on the substrate.

In an embodiment, the wafer-type measuring apparatus may be placed on an electrostatic chuck (ESC) at the bottom inside the process chamber, or may be placed between the ESC and a shower head at the top inside the process chamber.

In an embodiment, the wafer-type measuring apparatus may be placed between the ESC and the shower head by means of a wafer transfer robot (WTR), or may be placed between the ESC and the shower head by means of a height-adjusting supporter attached to the bottom of the wafer-type substrate.

In an embodiment, the wafer-type measuring apparatus may further include a leveling sensor placed on the wafer-type substrate.

In an embodiment, when the wafer-type measuring apparatus may be placed inside the process chamber by means of the WTR and an arm of the WTR is lowered, the leveling sensor may be configured to sense a vertical level of the wafer-type substrate.

In an embodiment, the MCU may be configured to analyze the vertical level to correct and signal process the magnetic flux density, or to signal process the magnetic flux density and the vertical level.

In an embodiment, the power supply may be charged through at least one of wireless charging, wired charging, and charging via universal serial bus (USB) connection.

In an embodiment, the wireless communication module may use at least one wireless communication method among ZigBee, wireless fidelity (WiFi), Bluetooth, radio-frequency identification (RFID), and controller area network (CAN).

In an embodiment, the wafer-type measuring apparatus may be configured to measure the magnetic flux density in the process chamber in a vacuum state without opening the process chamber.

In an embodiment, the MCU may be configured to map the magnetic flux density and distribution in the process chamber based on the magnetic flux density.

According to another aspect of the inventive concept, there is provided a wafer-type measuring apparatus including a wafer-type substrate, a plurality of magnetic flux density sensors disposed on the substrate in a radial array structure and configured to measure a magnetic flux density, a power supply disposed on the substrate, configured to supply power to the magnetic flux density sensors, and capable of wired/wireless charging, a MCU disposed on the substrate and configured to signal process the measured magnetic flux density, a leveling sensor disposed on the substrate and configured to sense a vertical level of the substrate, and a wireless communication module disposed on the substrate and configured to transmit a signal from the MCU to the outside, wherein the wafer-type measuring apparatus measures the magnetic flux density in a process chamber using a magnetic field, in a vacuum state without opening the process chamber.

In an embodiment, the wafer-type measuring apparatus may be placed on an ESC inside the process chamber, or placed between the ESC and a shower head by means of a WTR or a height-adjusting supporter.

In an embodiment, the leveling sensor may be configured to sense the vertical level of the wafer-type substrate when the wafer-type measuring apparatus is placed inside the process chamber by means of the WTR and an arm of the WTR is lowered, and the MCU may be configured to analyze the vertical level to correct and signal process the magnetic flux density, or to signal process the magnetic flux density and the vertical level.

According to another aspect of the inventive concept, there is provided a magnetic flux density measuring method, including introducing a wafer-type measuring apparatus into a process chamber using a magnetic field, controlling a location of the wafer-type measuring apparatus in the process chamber, measuring the magnetic flux density in the process chamber using the wafer-type measuring apparatus, and transmitting the measured magnetic flux density to the outside through signal processing and communication, wherein the wafer-type measuring apparatus comprises a wafer-type substrate, a plurality of magnetic flux density sensors disposed on the substrate and configured to measure the magnetic flux density, a power supply disposed on the substrate, configured to supply power to the magnetic flux density sensors, and capable of wired/wireless charging, a MCU disposed on the substrate and configured to signal process the measured magnetic flux density, a leveling sensor disposed on the substrate and configured to sense a vertical level of the substrate, and a wireless communication module disposed on the substrate and configured to transmit a signal from the MCU to the outside.

In an embodiment, the magnetic flux density sensors may be arranged on the substrate in a radial array structure to measure the magnetic flux density on the entire surface of the substrate.

In an embodiment, in the controlling of the location of the wafer-type measuring apparatus inside the process chamber, the wafer-type measuring apparatus may be controlled to be placed on the ESC in the process chamber or placed between the ESC and a shower head by means of a WTR or a height-adjusting supporter, wherein the magnetic flux density sensors are configured to measure the magnetic flux density in the process chamber at a location where the wafer-type measuring apparatus is placed.

In an embodiment, the leveling sensor may be configured to sense the vertical level of the wafer-type substrate when the wafer-type measuring apparatus is placed inside the process chamber by means of the WTR and an arm of the WTR is lowered, and the MCU may be configured to analyze the vertical level to correct and signal process the magnetic flux density, or to signal process the magnetic flux density and the vertical level.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
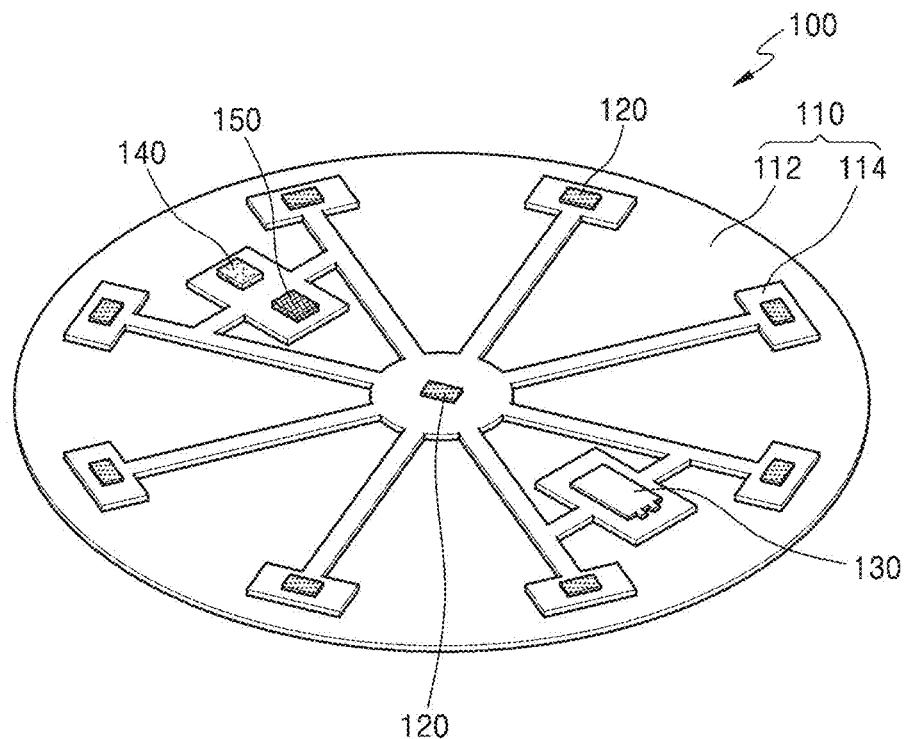
FIG. 1 is a perspective view of a wafer-type measuring apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the following description, when an element is described as being connected to another element, it may be directly connected to the other element, but a third element may be interposed therebetween. Similarly, when an element is described as being on top of another element, it may be directly on top of the other element, or a third element may be interposed therebetween. In addition, the structure or size of each element in the drawings is exaggerated for convenience and clarity of explanation, and parts irrelevant to the description are omitted. The same reference numerals are used for the same elements in the drawings, and duplicate descriptions thereof are omitted. The terms used herein are only used for the purpose of describing the disclosure, and are not used to limit the scope of the disclosure described in the claims.

Figure 2A:
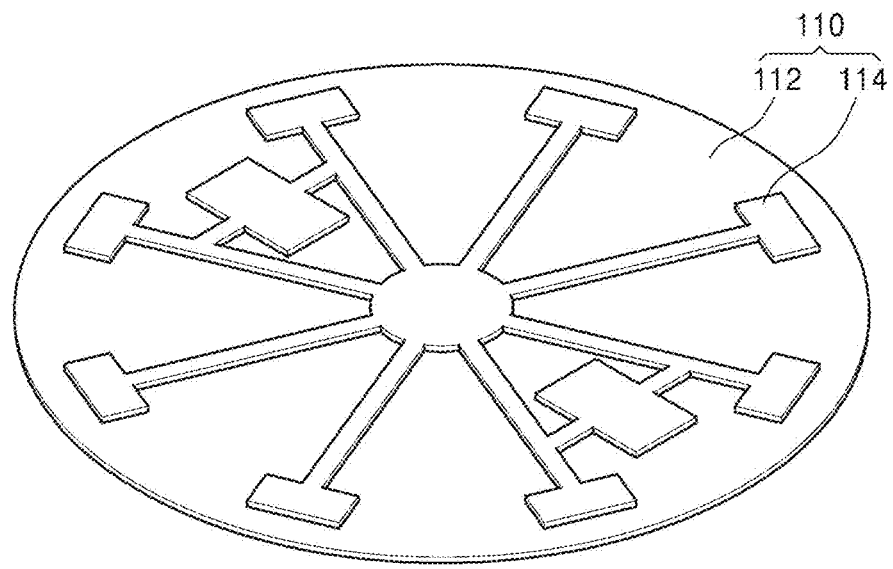
FIGS. 2A and 2B are a perspective view and an exploded perspective view of a substrate of the wafer-type measuring apparatus of FIG. 1.
Figure 2B:
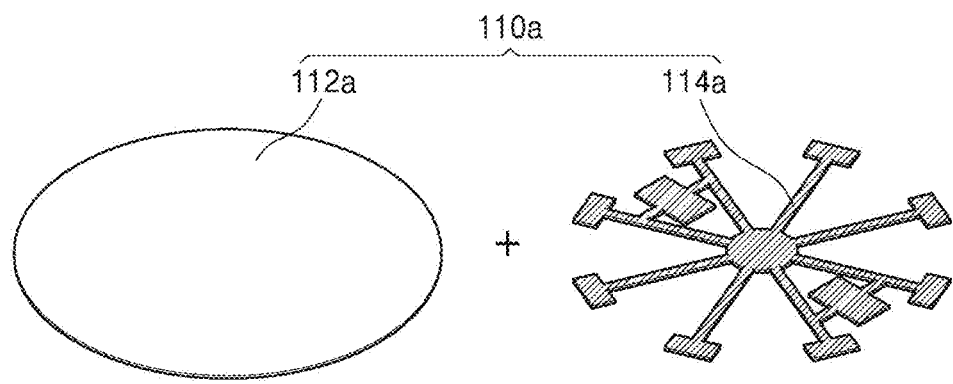

FIG. 1 is a perspective view of a wafer-type measuring apparatus according to an embodiment, and FIGS. 2A and 2B are respectively a perspective view and an exploded perspective view of a substrate of the wafer-type measuring apparatus of FIG. 1.

Referring to FIG. 1 to FIG. 2B, a wafer-type measuring apparatus 100 according to an embodiment may include a substrate 110, magnetic flux density sensors 120, a power supply 130, a microcontroller unit (MCU) 140, and a wireless communication module 150.

The substrate 110 may have a circular disk shape such as a wafer. That is, the substrate 110 may have a thin circular plate shape. The substrate 110 may be based on a printed circuit board (PCB) substrate in the wafer shape, or may be based on a silicon (Si) substrate or a ceramic substrate in the wafer shape. The substrate 110 may have substantially the same size and shape as a semiconductor wafer that is introduced into a process chamber and subject to semiconductor processing. However, according to an embodiment, the substrate 110 may have a size that is different from that of the semiconductor wafer, provided that a wafer transfer robot (WTR) is capable of transferring the substrate 110.

FIG. 2A shows a structure in which the substrate 110 is based on a PCB substrate. The substrate 110 based on the PCB substrate may include a PCB body 112 and a wiring layer 114. Components of the wafer-type measuring apparatus 100, i.e., the magnetic flux density sensors 120, the power supply 130, the MCU 140, and the wireless communication module 150, may be mounted on the PCB body 112, and may be electrically connected to each other through wires of the wiring layer 114. The wiring layer 114 may include all wires placed on the same level.

The PCB body 112 may include, for example, glass fiber and resin, such as FR4. In addition, the PCB body 112 may include bismaleimide-triazine (BT) resin, polycarbonate (PC) resin, build-up films such as an Ajinomoto build-up film (ABF), or other laminate resins, and the like. However, the material of the PCB body 112 is not limited to the above materials.

The wiring layer 114 may be placed on top of the PCB body 112 but is not limited thereto. The wiring layer 114 may be placed inside and/or underneath the PCB body 112. When wiring layers 114 are placed on different layers, wires on different layers may be connected through via contacts.

FIG. 2B shows a structure in which a substrate 110a is based on a Si substrate or a ceramic substrate. The substrate 110 based on the Si substrate or ceramic substrate may include a substrate body 112a and a PCB circuit film 114a. The substrate body 112a may be a silicon substrate or a ceramic substrate. As shown in FIG. 2B, the substrate body 112a may have a thin circular plate shape. In addition, wires or circuits may not be formed on the substrate body 112a.

The silicon substrate, as the term suggests, may include silicon. The ceramic substrate may include, for example, silicon carbide (SiC) or alumina ($Al_2O_3$). However, the material of the ceramic substrate is not limited to the above materials. For example, the ceramic substrate may include a variety of materials such as boron nitride (BN), zirconia ($ZrO_2$), mullite ($Al_2O_3$—$SiO_2$), magnesia (MgO), aluminum nitride (AlN), yttria ($Y_2O_3$), titanium aluminum (TiAl), and the like.

The PCB circuit film 114a may have a shape in which wires are placed on a thin PCB film. The PCB film may have substantially the same material as the PCB body 112 of the substrate 110 of FIG. 2A but may have a smaller thickness than the PCB body 112. In the PCB circuit film 114a of FIG. 2B, only the PCB film is shown and wires are not separately indicated. The PCB circuit film 114a may be bonded to the substrate body 112a using an adhesive or the like to form the substrate 110a.

The magnetic flux density sensors 120, the power supply 130, the MCU 140, and the wireless communication module 150 may be mounted on the PCT circuit film 114a before the PCB circuit film 114a is bonded to the substrate body 112a. After that, the PCB circuit film 114a may be bonded to the substrate body 112a. In an embodiment, after the PCB circuit film 114a is bonded to the substrate body 112a, the magnetic flux density sensors 120, the power supply 130, the MCU 140, and the wireless communication module 150 may be mounted onto the PCB circuit film 114a on the substrate body 112a.

The magnetic flux density sensors 120 may measure the strength of a magnetic field, for example, magnetic flux density. In the wafer-type measuring apparatus 100 according to an embodiment, the magnetic flux density sensor 120 may be, for example, a Gauss-meter. However, the magnetic flux density sensor 120 is not limited to the Gauss-meter. For example, the magnetic flux density sensor 120 may be implemented as a Hall sensor, a magneto-resistor (MR) sensor, a magneto-impedance (MI) sensor, and the like. For reference, the Gauss-meter may correspond to a Hall sensor using a semiconductor Hall device. According to an embodiment, the magnetic flux density sensor 120 may further include an integrated circuit for signal processing the measured magnetic flux density.

As shown in FIG. 1, one magnetic flux density sensor 120 may be placed at a central portion of the substrate 110 and eight magnetic flux density sensors 120 may be arranged at an outer portion of the substrate 110. However, the number and placement locations of the magnetic flux density sensors 120 are not limited thereto. For example, in the wafer-type measuring apparatus 100 according to an embodiment, various numbers of magnetic flux density sensors 120 may be placed at various locations on the substrate 110 to accurately measure the magnetic flux density of where measurement is required inside the process chamber. As a specific example, the magnetic flux density sensors 120 may be arranged only at the central portion of the substrate 110 or only at the outer portion of the substrate 110. In addition, the magnetic flux density sensors 120 may also be arranged at an intermediate portion between the central portion and the outer portion of the substrate 110.

The power supply 130 may supply power to the components of the wafer-type measuring apparatus 100. For example, the power supply 130 may supply power to the magnetic flux density sensors 120, the MCU 140, and the wireless communication module 150. The power supply 130 may include a battery capable of wired/wireless charging. For example, the power supply 130 may be charged through at least one of wireless charging, wired charging, and charging through a universal serial bus (USB) connection. The power supply 130 may be placed at an appropriate location on the substrate 110. Although one power supply 130 is shown in FIG. 1, the number of power supplies 130 is not limited to one. For example, in the wafer-type measuring apparatus 100 according to an embodiment, a plurality of power supplies 130 may be placed at a plurality of locations on the substrate 110.

The MCU 140 may generally control components of the wafer-type measuring apparatus 100 and signal process measured signals. For example, the MCU 140 may control an on/off operation of at least one of the magnetic flux density sensors 120, the power supply 130, and the wireless communication module 150. In addition, the MCU 140 may signal process the magnetic flux density measured by the magnetic flux density sensors 120 and map the magnetic flux density and distribution based on the measured magnetic flux density, wherein the mapping may refer to numerically and/or visually indicating the magnetic flux density and distribution for each location within the process chamber. Furthermore, the MCU 140 may perform various functions according to embedded programs.

The wireless communication module 150 may transfer a signal from the MCU 140 to the outside and may also transfer a signal from the outside to the MCU 140. The wireless communication module 150 may communicate with the outside through various wireless communication methods. For example, the wireless communication module 150 may communicate with the outside using at least one wireless communication method among ZigBee, wireless fidelity (WiFi), Bluetooth, radio-frequency identification (RFID), and controller area network (CAN). The communication method of the wireless communication module 150 is not limited to the above-described wireless communication methods.

The wafer-type measuring apparatus 100 according to an embodiment, based on the shape of the substrate 110, may have substantially the same shape as the semiconductor wafer subject to semiconductor processing. Accordingly, the wafer-type measuring apparatus 100 according to an embodiment may be introduced into the process chamber in the same manner as the semiconductor wafer and may measure the magnetic flux density in the process chamber. In addition, the wafer-type measuring apparatus 100 according to an embodiment may accurately measure the magnetic flux density in the process chamber in a vacuum state without opening the process chamber.

The wafer-type measuring apparatus 100 according to an embodiment may measure the magnetic flux density at various locations within the process chamber. For example, the wafer-type measuring apparatus 100 may be introduced into the process chamber by means of the WTR and may be placed on an electrostatic chuck (ESC). Accordingly, the wafer-type measuring apparatus 100 may measure the magnetic flux density in a region above the surface of the ESC and may map the magnetic flux density and distribution in the region above the surface of the ESC based on the measured magnetic flux density. In addition, the wafer-type measuring apparatus 100 may be placed between the ESC and a shower head by means of the WTR or a height-adjusting supporter. Accordingly, the wafer-type measuring apparatus 100 may measure the magnetic flux density in a region below the shower head and may map the magnetic flux density and distribution in the region below the shower head based on the measured magnetic flux density. The placement location of the wafer-type measuring apparatus 100 in the process chamber and the magnetic flux density measurement accordingly are described in more detail in the description of FIGS. 7A to 7C.

Figure 3:
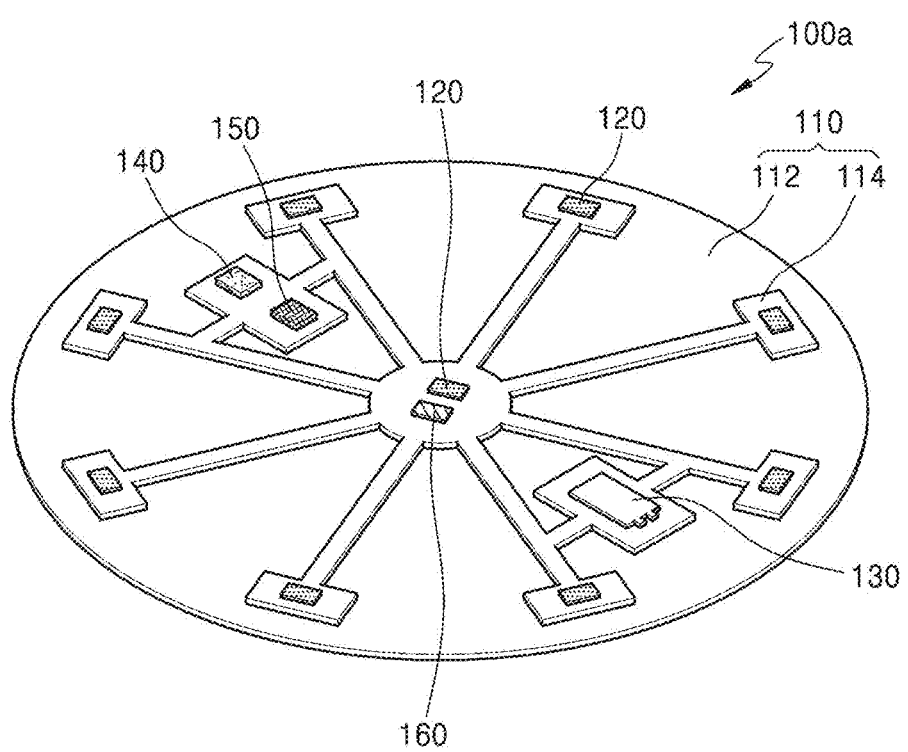
FIGS. 3 and 4 are perspective views of a wafer-type measuring apparatus according to some embodiments.

The wafer-type measuring apparatus 100 according to an embodiment may further include a leveling sensor (see 160 in FIG. 3). Accordingly, the wafer-type measuring apparatus 100 may sense, using the leveling sensor, a vertical level of the wafer-type measuring apparatus 100 according to the lowering or tilting of the arm of the WTR. In addition, it is possible to accurately measure the magnetic flux density in the process chamber by correcting the magnetic flux density based on the obtained vertical level of the wafer-type measuring apparatus 100. The leveling sensor, and vertical level sensing and magnetic flux density correction using the same are described in more detail in the description of FIGS. 3 and 8.

Figure 4:
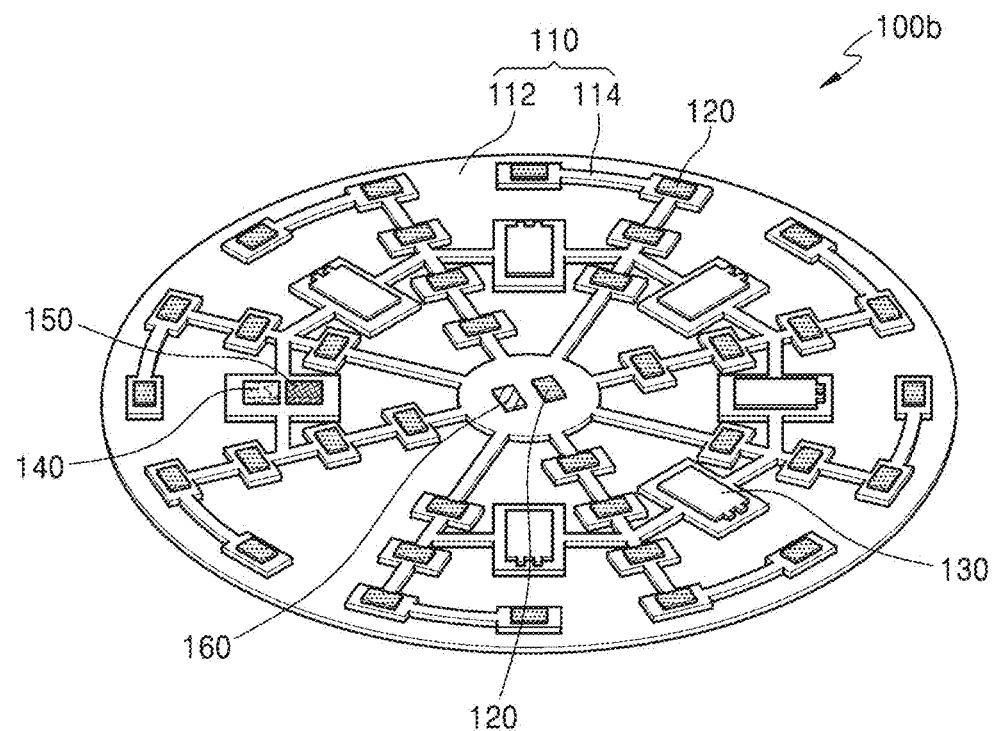

FIGS. 3 and 4 are perspective views of a wafer-type measuring apparatus according to some embodiments. The descriptions already given with reference to FIGS. 1 to 2B are briefly given or omitted.

Referring to FIG. 3, a wafer-type measuring apparatus 100a according to an embodiment may be different from the wafer-type measuring apparatus 100 of FIG. 1 in that the wafer-type measuring apparatus 100a further includes the leveling sensor 160. Specifically, the wafer-type measuring apparatus 100a according to an embodiment may include the substrate 110, the magnetic flux density sensors 120, the power supply 130, the MCU 140, the wireless communication module 150, and the leveling sensor 160. The substrate 110, the magnetic flux density sensors 120, the power supply 130, the MCU 140, and the wireless communication module 150 are as described in the description of the wafer-type measuring apparatus 100 of FIG. 1.

As shown in FIG. 3, the leveling sensor 160 may be placed at the central portion of the substrate 110. However, the placement location of the leveling sensor 160 is not limited to the central portion of the substrate 110. For example, according to an embodiment, the leveling sensor 160 may be placed out of the central portion of the substrate 110. In addition, according to embodiments, the number of leveling sensors 160 is not limited to one, and two or more leveling sensors 160 may be placed on the substrate 110.

The leveling sensor 160 may sense a vertical level of the substrate 110 at a location where the leveling sensor 160 is placed, wherein the vertical level of the substrate 110 may refer to a vertical height from a reference location, e.g., top surface of the ESC inside the process chamber. The leveling sensor 160 may be implemented as various types of leveling sensors, such as an ultrasonic leveling sensor, a capacitive leveling sensor, and a vibration-type leveling sensor.

The wafer-type measuring apparatus 100a according to an embodiment may further include the leveling sensor 160 to sense a vertical level of the wafer-type measuring apparatus 100a according to lowering or tilting of the arm of the WTR. In addition, the wafer-type measuring apparatus 100a according to an embodiment may correct the magnetic flux density measured by the magnetic flux density sensors 120 based on the sensed vertical level. Thus, the wafer-type measuring apparatus 100a according to an embodiment may accurately measure the magnetic flux density in the process chamber regardless of the lowering or tilting of the arm of the WTR. For reference, it is possible to correct the magnetic flux density based on the vertical level by the MCU 140 or an external computer may receive information on the magnetic flux density and vertical level and perform the correction by using a magnetic flux density correction program.

Referring to FIG. 4, a wafer-type measuring apparatus 100b according to an embodiment may be different from the wafer-type measuring apparatus 100a of FIG. 3 in the number and the placement location of magnetic flux density sensors 120 and the number and the placement location of power supplies 130. Specifically, the wafer-type measuring apparatus 100b according to an embodiment may include the substrate 110, the magnetic flux density sensors 120, the power supplies 130, the MCU 140, the wireless communication module 150, and the leveling sensor 160. The substrate 110, the MCU 140, the wireless communication module 150, and the leveling sensor 160 are as described in the description of the wafer-type measuring apparatuses 100 and 100a of FIGS. 1 and 3.

In the wafer-type measuring apparatus 100b according to an embodiment, dozens of magnetic flux density sensors 120 may be arranged on the entire surface of the substrate 110. Since dozens of magnetic flux density sensors 120 are placed on the entire surface of the substrate 110, the magnetic flux density in the region above the entire surface of the substrate 110 may be more accurately measured.

In the wafer-type measuring apparatus 100b according to an embodiment, dozens of magnetic flux density sensors 120 may be arranged on the entire surface of the substrate 110 in a substantially radial array structure, for example. The radial array structure may refer to a structure in which corresponding elements are placed at the same distance from the center while spreading radially. In FIG. 4, the magnetic flux density sensors 120 are placed from the center to a first location to a fourth location, four of which may be placed in the first location, eight of which may be placed in each of the second and third locations, and sixteen of which may be placed in the fourth location. Therefore, in the wafer-type measuring apparatus 100b according to an embodiment, the magnetic flux density sensors 120 may be arranged in a substantially radial array structure, although not exactly placed in a radial array structure.

In the wafer-type measuring apparatus 100b according to an embodiment, six power supplies 130 may be placed. However, the number of power supplies 130 is not limited to six. For example, depending on an embodiment, the number of power supplies 130 may be five or less, or seven or more. In the wafer-type measuring apparatus 100b according to an embodiment, as the plurality of power supplies 130 are placed, sufficient power may be supplied to the components of the wafer-type measuring apparatus 100b. Accordingly, each of the components of the wafer-type measuring apparatus 100b may operate quickly and accurately, and the magnetic flux density in the process chamber may be more quickly and accurately measured.

The wafer-type measuring apparatus 100b according to an embodiment may accurately measure the strength and distribution of the magnetic field inside the process chamber based on the numerous magnetic flux density sensors 120 arranged in a radial array structure on the substrate 110, a sufficient number of power supplies 130, and the leveling sensor 160. As a result, the wafer-type measuring apparatus 100b according to an embodiment may contribute to accurately determining the strength and distribution of the magnetic field inside the process chamber, and may effectively perform tool to tool matching (TTML).

Figure 5A:
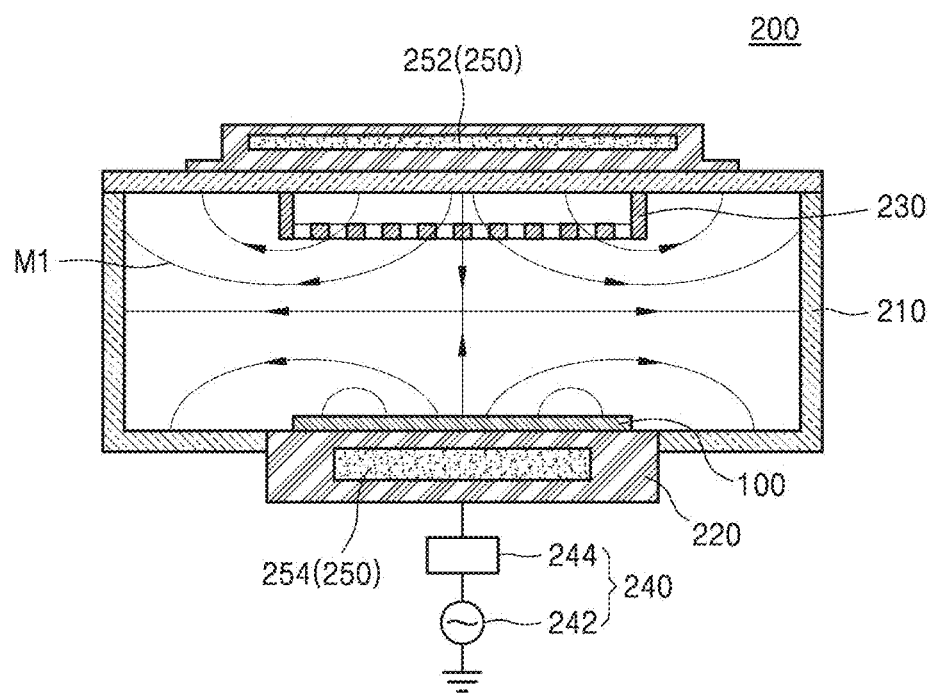
FIGS. 5A and 5B are schematic conceptual diagrams of process chambers in which the wafer-type measuring apparatus of FIG. 1 is used.
Figure 5B:
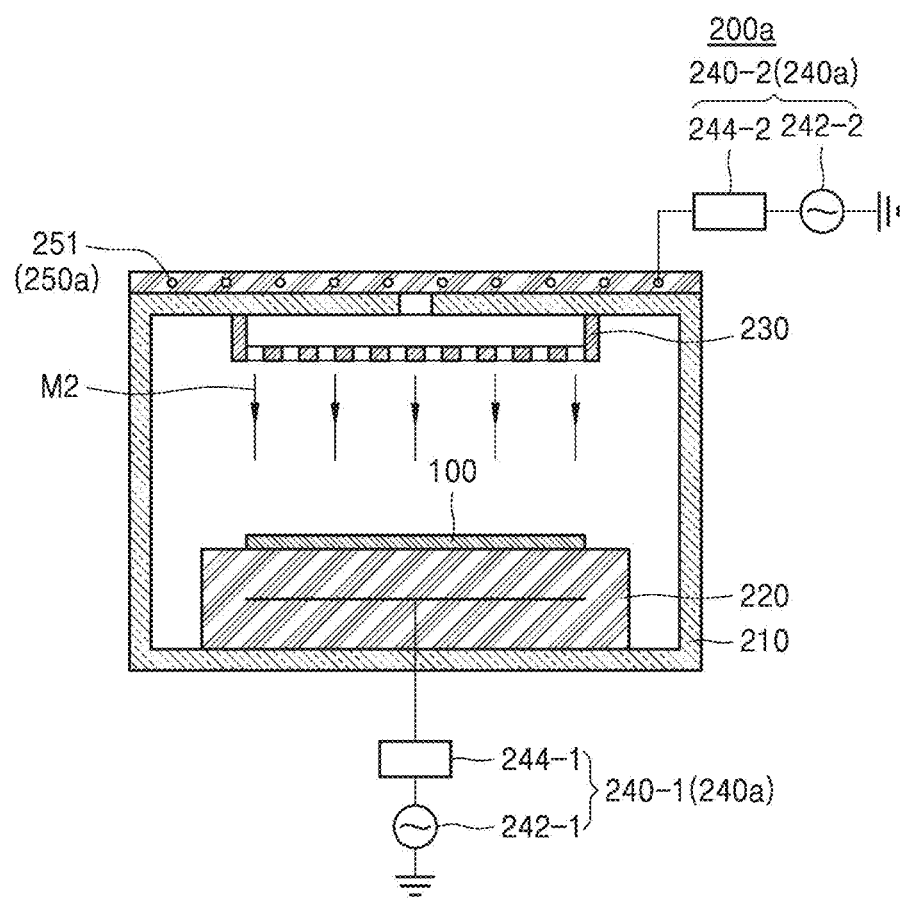

FIGS. 5A and 5B are schematic conceptual diagrams of process chambers in which the wafer-type measuring apparatus of FIG. 1 is used. FIGS. 5A and 5B are described with reference to FIG. 1, and the descriptions already given with reference to FIGS. 1 to 4 are briefly given or omitted.

Referring to FIG. 5A, the wafer-type measuring apparatus 100 according to an embodiment may be placed and used inside a process chamber 200 using a magnetic field. The process chamber 200 may be a process chamber that performs semiconductor processing using plasma. For example, the process chamber 200 may be a process chamber for reactive ion etching (RIE) using a magnetic field. However, the process chamber 200 is not limited to a process chamber for RIE. The wafer-type measuring apparatus 100 according to an embodiment may be, for example, the wafer-type measuring apparatus 100 of FIG. 1.

The process chamber 200 may include a chamber body 210, an ESC 220, a shower head 230, a power supply unit 240, and a magnet unit 250. The chamber body 210 may define a space in which plasma processing is performed. A sidewall of the chamber body 210 may be provided with an exit port through which semiconductor wafers enter and exit. The ESC 220 may be placed at the bottom inside the chamber body 210, and may fix and support wafers using electrostatic force. However, according to an embodiment, a chuck using mechanical clamping or vacuum, instead of the ESC 220, may be used.

The shower head 230 may be placed at the top inside the chamber body 210 so as to face the ESC 220 in a vertical direction inside the chamber body 210. The shower head 230 may include a plurality of injection holes for injecting process gas into the chamber body 210. The shower head 230 may function as an upper electrode. Accordingly, power may be applied to the shower head 230.

The power supply unit 240 may include a power supply 242 and a matcher 244. The power supply 242 may apply power to the ESC 220. In addition, the power supply 242 may apply power to a lower electrode inside the ESC 220. The lower electrode may control the characteristics of plasma together with the shower head 230 corresponding to the upper electrode. The matcher 244 may adjust impedance so that maximum power is delivered to the process chamber 200.

The magnet unit 250 may include a first magnet 252 and a second magnet 254. The first magnet 252 may be placed above and outside the chamber body 210, and the second magnet 254 may be placed inside the ESC 220. However, the locations of the first magnet 252 and the second magnet 254 are not limited thereto. In addition, the number of magnets of the magnet unit 250 is not limited to two. For example, one magnet or three or more magnets of the magnet unit 250 may be placed outside or inside the chamber body 210.

The first magnet 252 and the second magnet 254 of the magnet unit 250 may be permanent magnets or electromagnets. In the process chamber 200 of FIG. 5A, the first magnet 252 and the second magnet 254 may be permanent magnets. Accordingly, the lines of magnetic force M1 of each of the first magnet 252 and the second magnet 254 are shown in a form directed from the center to both ends. As described above, the magnetic field may improve the performance of semiconductor processing using plasma. Accordingly, to precisely control plasma, it is necessary to accurately measure the strength of a magnetic field, that is, a magnetic flux density in a process chamber.

The wafer-type measuring apparatus 100 according to an embodiment may have substantially the same shape as a semiconductor wafer, and may be placed on the ESC 220. Therefore, the magnetic flux density in the process chamber 200 may be accurately measured using the wafer-type measuring apparatus 100. Instead of the wafer-type measuring apparatus 100 of FIG. 1, the wafer-type measuring apparatus 100a or 100b of FIG. 3 or FIG. 4 may be placed inside the process chamber 200, and may be used as the wafer-type measuring apparatus 100 according to an embodiment to measure magnetic flux density.

Referring to FIG. 5B, the wafer-type measuring apparatus 100 according to an embodiment may be placed in a process chamber 200a using a magnetic field. The process chamber 200a may be a process chamber that performs semiconductor processing using plasma. For example, the process chamber 200a may be a process chamber for RIE using a magnetic field. However, the process chamber 200a is not limited to a process chamber for RIE. The wafer-type measuring apparatus 100 according to an embodiment may be the wafer-type measuring apparatus 100 of FIG. 1.

The process chamber 200a may include a chamber body 210, an ESC 220, a shower head 230, a power supply unit 240a, and a magnet unit 250a. The chamber body 210, the ESC 220, and the shower head 230 are as described in the description of the process chamber 200 of FIG. 5A.

The power supply unit 240a may include a lower power supply unit 240-1 and an upper power supply unit 240-2. The lower power supply unit 240-1 may include a lower power supply 242-1 and a lower matcher 244-1. The lower power supply unit 240-1 may be substantially the same as the power supply unit 240 of the process chamber 200 of FIG. 5A. Accordingly, the lower power supply 242-1 may correspond to the power supply 242, and the lower matcher 244-1 may correspond to the matcher 244.

The upper power supply unit 240-2 may include an upper power supply 242-2 and an upper matcher 244-2. The upper power supply 242-2 may supply power to an antenna 251 of the magnet unit 250a. The upper matcher 244-2 may adjust impedance so that maximum power is delivered to the process chamber 200a. The upper power supply unit 240-2 may supply power to the shower head 230 functioning as an upper electrode.

The magnet unit 250a may include the antenna 251. The antenna 251 may be placed above and outside the chamber body 210. Specifically, the antenna 251 may be placed above the shower head 230 and may have a coil shape. Based on the coil shape, the antenna 251 is also referred to as a coil antenna. In the process chamber 200a, the antenna 251 may correspond to a kind of electromagnet. In addition, the magnetic field by the antenna 251 may be directed downward. Accordingly, as shown in FIG. 5B, the lines of magnetic force M2 may be directed downward. However, depending on the placement structure of the antenna 251 and applied power, the direction of the lines of magnetic force may be shown differently.

To precisely control plasma in the process chamber 200a, it is necessary to accurately measure the strength of the magnetic field, that is, magnetic flux density in the process chamber 200a. Accordingly, the magnetic flux density in the process chamber 200a may be accurately measured using the wafer-type measuring apparatus 100 according to an embodiment. As the wafer-type measuring apparatus 100 according to an embodiment, the wafer-type measuring apparatus 100a or 100b of FIG. 3 or FIG. 4, instead of the wafer-type measuring apparatus 100 of FIG. 1, may be placed inside the process chamber 200a, and may be used to measure the magnetic flux density.

Figure 6:
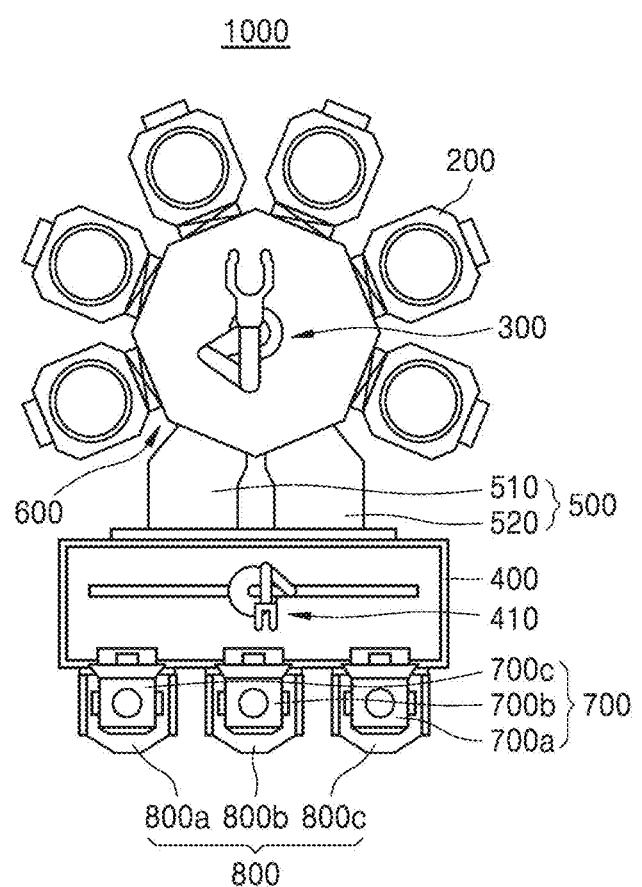
FIG. 6 is a schematic conceptual diagram of entire semiconductor processing equipment including the process chamber of FIG. 5A.

FIG. 6 is a schematic conceptual diagram of entire semiconductor processing equipment including the process chamber of FIG. 5A. The descriptions already given with reference to FIGS. 1 to 5B are briefly given or omitted.

Referring to FIG. 6, semiconductor processing equipment 1000 includes an index module 400, load-lock chambers 500, a transfer chamber 600, process chambers 200, and load port modules 800.

The semiconductor processing equipment 1000 may process a plurality of wafers through various processes such as an etching process and a cleaning process. The semiconductor processing equipment 1000 may be implemented as a multi-process chamber type substrate processing system including first and second WTRs 410 and 300 for transferring wafers and the plurality of process chambers 200 placed around the second WTR 300.

The load port module 800 is a device on which a container 700 on which a plurality of wafers are mounted, e.g., a front opening unified pod (FOUP), is seated. A plurality of load port modules 800 may be placed in front of the index module 400. Containers 700a, 700b, and 700c respectively seated on load ports 800a, 800b, and 800c may load the same products or different products.

The index module 400 may be placed between the load port modules 800 and the load-lock chambers 500 to provide an interface between the containers 700 on the load port modules 800 and the load-lock chambers 500 to transfer wafers. The index module 400 may include the first WTR 410 for transferring wafers. The first WTR 410 may operate in an atmospheric pressure environment and may transfer wafers between the containers 700 and the load-lock chambers 500.

The load-lock chamber 500 may function as a buffer between an input port and an output port on the semiconductor processing equipment 1000. The load-lock chamber 500 may include a buffer stage in which wafers temporarily stand by. A plurality of load-lock chambers 500 may be provided between the index module 400 and the transfer chamber 600. For example, the first load-lock chamber 510 and the second load-lock chamber 520 may be provided between the index module 400 and the transfer chamber 600. The first load-lock chamber 510 may be used to transfer wafers from the index module 400 to the transfer chamber 600, and the second load-lock chamber 520 may be used to transfer wafers from the transfer chamber 600 to the index module 400. The wafers may be loaded or unloaded into the load-lock chamber 500 by the second WTR 300 of the transfer chamber 600. In addition, the wafers may be loaded or unloaded into the load-lock chamber 500 by the first WTR 410 of the index module 400.

The load-lock chamber 500 may maintain pressure while changing its interior into a vacuum environment and an atmospheric pressure environment using a gate valve or the like. Thus, the load-lock chamber 500 may prevent the internal air pressure state of the transfer chamber 600 from being changed. More specifically, when the wafers are loaded or unloaded by the second WTR 300, the inside of the load-lock chamber 500 may be made into the same or similar vacuum environment as that of the transfer chamber 600. In addition, when the wafers are loaded or unloaded by the first WTR 410, the inside of the load-lock chamber 500 may be made into an atmospheric pressure environment.

The transfer chamber 600 may transfer wafers between the load-lock chambers 500 and the process chambers 200. The transfer chamber 600 may include at least one second WTR 300 for this purpose. The second WTR 300 may transfer unprocessed wafers from the load-lock chambers 500 to the process chambers 200 or transfer processed wafers from the process chambers 200 to the load-lock chambers 500. The second WTR 300 may operate in a vacuum environment.

The process chamber 200 may be a device that performs semiconductor processing on wafers using plasma. In addition, the process chamber 200 may perform semiconductor processing on wafers using a magnetic field. The process chamber 200 may be, for example, the process chamber 200 of FIG. 5A. However, instead of the process chamber 200 of FIG. 5A, the process chamber 200a of FIG. 5B may be used as the process chamber 200. In addition, another type of process chamber using a magnetic field may be used as the process chamber 200 of the semiconductor processing equipment 1000.

A plurality of process chambers 200 may be placed around the transfer chamber 600. In this case, the process chambers 200 may receive wafers from the transfer chamber 600 through the second WTR 300, may perform semiconductor processing on the wafers, and may transfer the processed wafers to the transfer chamber 600 through the second WTR 300.

The semiconductor processing equipment 1000 may have a cluster platform structure. In this case, the plurality of process chambers 200 may be placed in a cluster manner based on the transfer chamber 600, and the plurality of load-lock chambers 500 may be placed in one direction. However, the structure of the semiconductor processing equipment 1000 is not limited to the cluster platform structure. For example, the semiconductor processing equipment 1000 may have a quad platform or inline platform structure. The quad platform structure may have a structure in which process chambers are placed on three sides of a rectangular transfer chamber and a load-lock chamber is placed on the other side. In addition, the inline platform structure may have a structure in which a transfer chamber is elongated in one direction, process chambers are placed on both long sides, and a load-lock chamber is placed on one short side.

The wafer-type measuring apparatus 100 according to an embodiment may measure the magnetic flux density in the process chamber 200 of the semiconductor processing equipment 1000. In addition, the magnetic flux density in the process chamber 200 in a vacuum state may be measured without opening the process chamber 200.

Figure 7A:
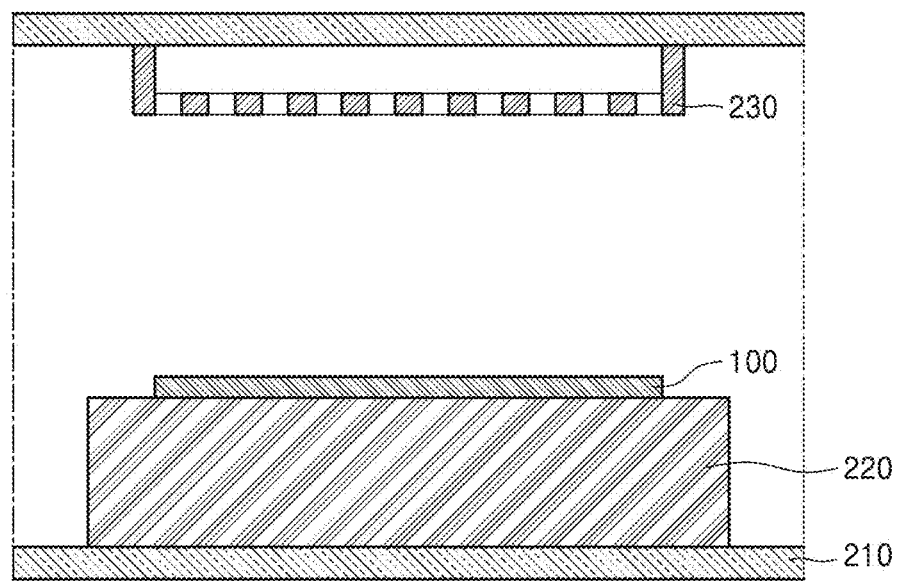
FIGS. 7A to 7C are conceptual diagrams showing locations where the wafer-type measuring apparatus of FIG. 1 is placed inside a process chamber.
Figure 7B:
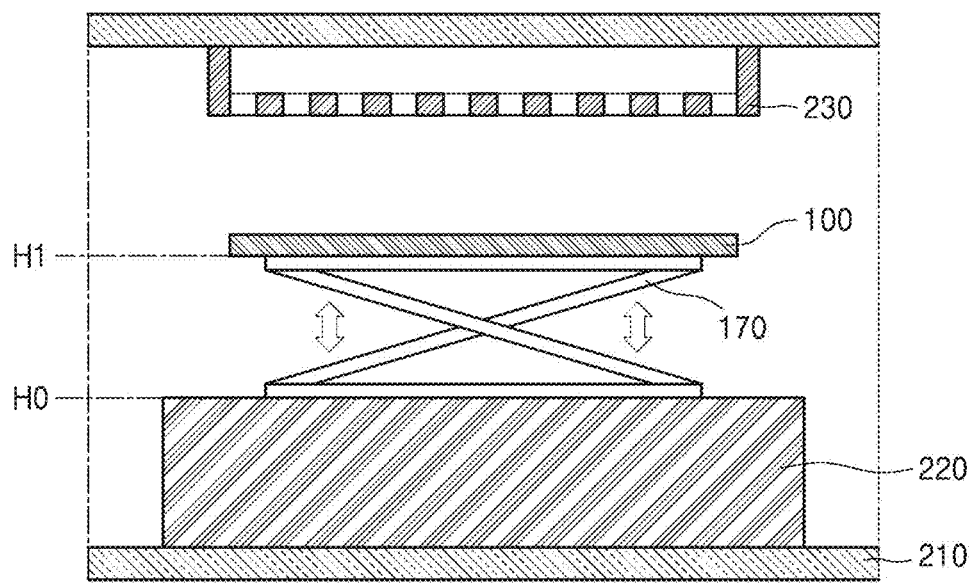
Figure 7C:
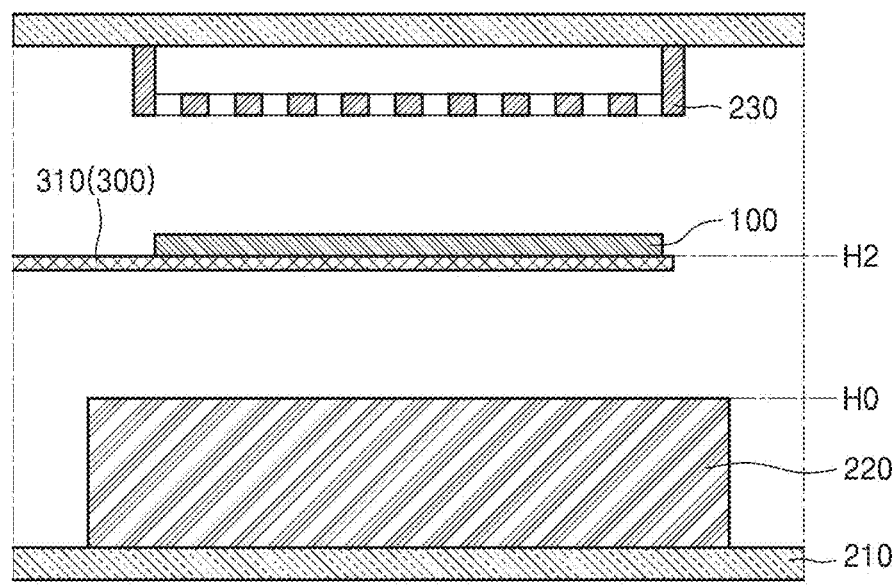

FIGS. 7A to 7C are conceptual diagrams showing locations where the wafer-type measuring apparatus of FIG. 1 is placed inside a process chamber. FIGS. 7A to 7C are described with reference to FIG. 5B, and the descriptions already given with reference to FIGS. 1 to 6 are briefly given or omitted.

Referring to FIG. 7A, the wafer-type measuring apparatus 100 according to an embodiment may be placed on the ESC 220. Accordingly, the wafer-type measuring apparatus 100 may measure the magnetic flux density of the region above the top surface of the ESC 220. In addition, the wafer-type measuring apparatus 100 may map the magnetic flux density and distribution in the region above the top surface of the ESC 220 in the process chamber 200 based on the measured magnetic flux density. The wafer-type measuring apparatus 100 may be placed on the ESC 220 of the process chamber 200 by means of the second WTR 300 of the transfer chamber 600.

Referring to FIG. 7B, the wafer-type measuring apparatus 100 according to an embodiment is placed on the ESC 220, and may be spaced apart from the top surface of the ESC 220 by means of a height-adjusting supporter 170. For example, when the top surface of the ESC 220 is at a reference height H0, the wafer-type measuring apparatus 100 may be spaced apart from the top surface of the ESC 220 to be placed at the first height H1. Accordingly, the wafer-type measuring apparatus 100 may measure the magnetic flux density of the region below the shower head 230. In addition, the wafer-type measuring apparatus 100 may map the magnetic flux density and distribution in the region below the shower head 230 in the process chamber 200a based on the measured magnetic flux density.

The height-adjusting supporter 170 may be coupled to the bottom surface of the wafer-type measuring apparatus 100 and may be placed on the ESC 220 together with the wafer-type measuring apparatus 100. In addition, the height of the height-adjusting supporter 170 may be controlled according to an external signal. Accordingly, the wafer-type measuring apparatus 100 and the magnetic flux density sensors 120 mounted therein may be placed at a required location above the ESC 220 by means of the height-adjusting supporter 170.

In addition, in the process chamber, when a distance between the top surface of the ESC 220 and the shower head 230 is very small, about several centimeters, a thickness of the wafer-type measuring apparatus 100, e.g., a thickness of the substrate 110, may be adjusted to place the magnetic flux density sensors 120 at a required location above the ESC 220.

Referring to FIG. 7C, the wafer-type measuring apparatus 100 according to an embodiment may be placed on the ESC 220 and may be spaced apart from the top surface of the ESC 220 by means of the second WTR 300. For example, when the top surface of the ESC 220 is at the reference height H0, the wafer-type measuring apparatus 100 may be spaced apart from the top surface of the ESC 220 to be placed at the second height H2. Accordingly, the wafer-type measuring apparatus 100 may measure the magnetic flux density of the region below the shower head 230. In addition, the wafer-type measuring apparatus 100 may map the magnetic flux density and distribution in the region below the shower head 230 in the process chamber 200a based on the measured magnetic flux density.

As can be seen from FIG. 7C, the wafer-type measuring apparatus 100 may measure the magnetic flux density in the process chamber 200a while being attached to the arm 310 of the second WTR 300. Accordingly, the height of the wafer-type measuring apparatus 100 and the magnetic flux density sensors 120 mounted therein may be adjusted by the second WTR 300.

Figure 8:
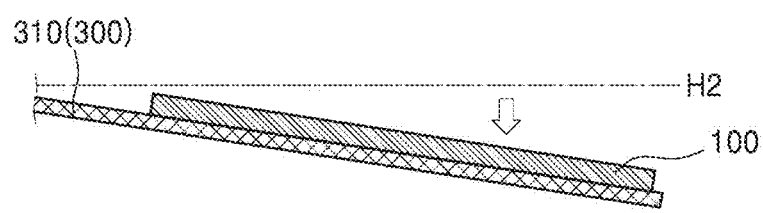
FIG. 8 is a conceptual diagram for illustrating an operation of a leveling sensor in the wafer-type measuring apparatus of FIG. 3 or FIG. 4.

FIG. 8 is a conceptual diagram for illustrating an operation of a leveling sensor in the wafer-type measuring apparatus of FIG. 3 or FIG. 4.

Referring to FIG. 8, as described in the description of FIG. 7C, the wafer-type measuring apparatus 100 may measure the magnetic flux density in the process chamber 200 while being attached to the arm 310 of the second WTR 300. In other words, the wafer-type measuring apparatus 100 may measure the magnetic flux density in the process chamber 200 while being attached to the arm 310 of the second WTR 300 which moves the wafer-type measuring apparatus 100, not being supported by a separate support means such as the height-adjusting supporter 170. Accordingly, when the arm 310 of the second WTR 300 is elongated in a direction and the wafer-type measuring apparatus 100 is relatively heavy, the arm 310 of the second WTR 300 may be lowered or tilted.

For example, as shown in FIG. 8, the arm 310 of the second WTR 300 and the wafer-type measuring apparatus 100 placed on the arm 310 may not be at the location of the second height H2 and may be lowered or tilted. Therefore, it is not possible for the magnetic flux density sensor 120 to accurately measure the magnetic flux density at the second height H2. The wafer-type measuring apparatus 100a and 100b according to an embodiment may include a leveling sensor 160, and the leveling sensor 160 may sense the vertical level and/or inclination of the wafer-type measuring apparatus 100a and 100b. The information on the vertical level and/or inclination sensed by the leveling sensor 160 may be transferred to the MCU 140. The MCU 140 may directly correct the magnetic flux density based on the corresponding information. In addition, the MCU 140 may transfer the corresponding information to the outside through the wireless communication module 150 and an external computer or the like may correct the magnetic flux density through a magnetic flux density correction program.

Figure 9:
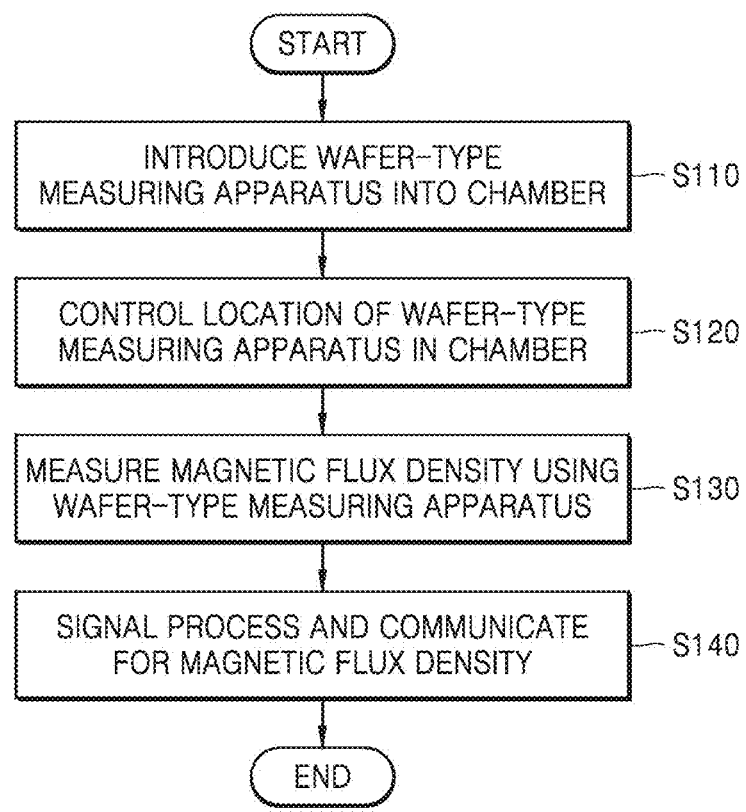
FIG. 9 is a flowchart schematically illustrating a process of a magnetic flux density measuring method using a wafer-type measuring apparatus according to an embodiment.

FIG. 9 is a flowchart schematically illustrating a process of a magnetic flux density measuring method using a wafer-type measuring apparatus according to an embodiment. FIG. 9 is described with reference to FIGS. 1, 5A, and 6, and descriptions already given with reference to FIGS. 1 to 8 are briefly given or omitted.

Referring to FIG. 9, in a method of measuring magnetic flux density using a wafer-type measuring apparatus (hereinafter simply referred to as "a magnetic flux density measuring method"), first, the wafer-type measuring apparatus 100 is introduced into the process chamber 200 using the magnetic field (S110). The wafer-type measuring apparatus 100 may be, for example, the wafer-type measuring apparatus 100 of FIG. 1 but is not limited thereto. Instead of the wafer-type measuring apparatus 100 of FIG. 1, the wafer-type measuring apparatus 100a or 100b of FIG. 3 or FIG. 4 may be used. The wafer-type measuring apparatus 100 may be introduced into the process chamber 200 through the load port module 800, the index module 400, the load-lock chamber 500, and the transfer chamber 600, and may be introduced into the process chamber 200 using the second WTR 300 of the transfer chamber 600.

Subsequently, the location of the wafer-type measuring apparatus 100 within the process chamber 200 is controlled (S120). For example, the wafer-type measuring apparatus 100 may be placed on the ESC 220 or may be placed between the ESC 220 and the shower head 230 in the process chamber 200 using the height-adjusting supporter 170 or the arm 310 of the second WTR 300. In addition, when placed between the ESC 220 and the shower head 230, the wafer-type measuring apparatus 100 may be adjusted to be accurately placed at a required height.

Subsequently, the magnetic flux density in the process chamber 200 is measured using the wafer-type measuring apparatus 100 (S130). Each of the magnetic flux density sensors 120 placed on the substrate 110 may measure the magnetic flux density in the corresponding region at a height where the wafer-type measuring apparatus 100 is placed. When the wafer-type measuring apparatus 100 includes the leveling sensor 160, the vertical level may also be sensed by the leveling sensor 160.

Subsequently, the magnetic flux density measured by each of the magnetic flux density sensors 120 is transferred to the MCU 140, signal processed in the MCU 140, and transferred to the outside through the wireless communication module 150 (S140). In addition, when the vertical level is sensed by the leveling sensor 160, the information on the vertical level may be transmitted to the MCU 140 and may be used for correcting the magnetic flux density.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A wafer-type measuring apparatus comprising:
    a wafer-type substrate;
    magnetic flux density sensors disposed on the wafer-type substrate and configured to measure a magnetic flux density;
    a power supply disposed on the substrate and configured to supply power to the magnetic flux density sensors;
    a microcontroller unit (MCU) disposed on the substrate and configured to signal process the measured magnetic flux density;
    a leveling sensor disposed on the wafer-type substrate and configured to sense a vertical level of the wafer-type substrate; and
    a wireless communication module disposed on the substrate and configured to transmit a signal from the MCU to the outside;
    wherein:
        the wafer-type measuring apparatus is configured to measure the magnetic flux density in a process chamber using a magnetic field, and
        the MCU is configured to correct the magnetic flux density based on the sensed vertical level of the wafer-type substrate or correct the magnetic flux density by transmitting the sensed vertical level of the wafer-type substrate to an outside of the wafer-type measuring apparatus through the wireless communication module.

2. The wafer-type measuring apparatus of claim 1, wherein the substrate comprises
    a printed circuit board (PCB) substrate, a silicon substrate, or a ceramic substrate.

3. The wafer-type measuring apparatus of claim 2, wherein, when the substrate is the PCB substrate,
    the magnetic flux density sensors, the power supply, and the wireless communication module are placed in the form of a circuit in the PCB substrate, and
    when the substrate is the silicon substrate or the ceramic substrate,
    the magnetic flux density sensors, the power supply, and the wireless communication module are fabricated as a separate PCB circuit film,
    to form a structure in which the PCB circuit film is bonded to the substrate.

4. The wafer-type measuring apparatus of claim 1, wherein the magnetic flux density sensors are arranged in a radial array structure on the substrate.

5. The wafer-type measuring apparatus of claim 1, wherein the wafer-type measuring apparatus is placed on an electrostatic chuck (ESC) at the bottom inside the process chamber, or
    is placed between the ESC and a shower head at the top inside the process chamber.

6. The wafer-type measuring apparatus of claim 5, wherein the wafer-type measuring apparatus is placed between the ESC and the shower head by means of a wafer transfer robot (WTR), or
    is placed between the ESC and the shower head by means of a height-adjusting supporter attached to the bottom of the wafer-type substrate.

7. The wafer-type measuring apparatus of claim 1, wherein, when the wafer-type measuring apparatus is placed inside the process chamber by means of the WTR and an arm of the WTR is lowered.

8. The wafer-type measuring apparatus of claim 7, wherein the MCU is configured to
    analyze the vertical level of the wafer-type substrate to correct and signal process the magnetic flux density, or
    to signal process the magnetic flux density and the vertical level.

9. The wafer-type measuring apparatus of claim 1, wherein the power supply is
    charged through at least one of wireless charging, wired charging, and charging via universal serial bus (USB) connection.

10. The wafer-type measuring apparatus of claim 1, wherein the wireless communication module
    uses at least one wireless communication method among ZigBee, wireless fidelity (WiFi), Bluetooth, radio-frequency identification (RFID), and controller area network (CAN).

11. The wafer-type measuring apparatus of claim 1, wherein the wafer-type measuring apparatus is configured to measure the magnetic flux density in the process chamber in a vacuum state without opening the process chamber.

12. The wafer-type measuring apparatus of claim 1, wherein the MCU is configured to
    map magnetic flux density and distribution in the process chamber based on the magnetic flux density.

13. A wafer-type measuring apparatus comprising:
a wafer-type substrate;
a plurality of magnetic flux density sensors disposed on the wafer-type substrate in a radial array structure and configured to measure a magnetic flux density;
a power supply disposed on the substrate, configured to supply power to the magnetic flux density sensors, and capable of wired/wireless charging;
a microcontroller unit (MCU) disposed on the substrate and configured to signal process the measured magnetic flux density;
a leveling sensor disposed on the substrate and configured to sense a vertical level of the substrate; and
a wireless communication module disposed on the substrate and configured to transmit a signal from the MCU to the outside;
wherein:
the wafer-type measuring apparatus is configured to measure the magnetic flux density in a process chamber using a magnetic field, in a vacuum state without opening the process chamber, and
the MCU is configured to correct the magnetic flux density based on the sensed vertical level of the wafer-type substrate or correct the magnetic flux density by transmitting the sensed vertical level of the wafer-type substrate to an outside of the wafer-type measuring apparatus through the wireless communication module.

14. The wafer-type measuring apparatus of claim 13, wherein the wafer-type measuring apparatus is placed on an electrostatic chuck (ESC) inside the process chamber, or placed between the ESC and a shower head by means of a wafer transfer robot (WTR) or a height-adjusting supporter.

15. The wafer-type measuring apparatus of claim 13, wherein the leveling sensor is configured to
sense the vertical level of the wafer-type substrate when the wafer-type measuring apparatus is placed inside the process chamber by means of the WTR and an arm of the WTR is lowered, and
wherein the MCU is configured to
analyze the vertical level to correct and signal process the magnetic flux density, or
to signal process the magnetic flux density and the vertical level of the wafer-type substrate.

16. A magnetic flux density measuring method comprising:
introducing a wafer-type measuring apparatus into a process chamber using a magnetic field;
controlling a location of the wafer-type measuring apparatus in the process chamber;
measuring magnetic flux density in the process chamber using the wafer-type measuring apparatus; and
transmitting the measured magnetic flux density to the outside through signal processing and communication;
wherein the wafer-type measuring apparatus comprises
a wafer-type substrate,
a plurality of magnetic flux density sensors disposed on the wafer-type substrate and configured to measure the magnetic flux density,
a power supply disposed on the substrate, configured to supply power to the magnetic flux density sensors, and capable of wired/wireless charging,
a microcontroller unit (MCU) disposed on the substrate and configured to signal process the measured magnetic flux density;
a leveling sensor disposed on the substrate and configured to sense a vertical level of the substrate; and
a wireless communication module disposed on the substrate and configured to transmit a signal from the MCU to the outside,
the magnetic flux density measuring method further comprises, by the MCU, correcting the magnetic flux density based on the sensed vertical level of the wafer-type substrate or correcting the magnetic flux density by transmitting the sensed vertical level of the wafer-type substrate to the outside of the wafer-type measuring apparatus through the wireless communication module.

17. The magnetic flux density measuring method of claim 16,
wherein the magnetic flux density sensors are placed on the substrate in a radial array structure to measure the magnetic flux density on the entire surface of the substrate.

18. The magnetic flux density measuring method of claim 16,
wherein, in the controlling of the location of the wafer-type measuring apparatus inside the process chamber,
the wafer-type measuring apparatus is controlled to be placed on an electrostatic chuck (ESC) in the process chamber or placed between the ESC and a shower head by means of a wafer transfer robot (WTR) or a height-adjusting supporter,
wherein the magnetic flux density sensors are configured to measure the magnetic flux density in the process chamber at a location where the wafer-type measuring apparatus is placed.

19. The magnetic flux density measuring method of claim 16,
wherein the leveling sensor is configured to
sense the vertical level of the wafer-type substrate when the wafer-type measuring apparatus is placed inside the process chamber by means of the WTR and an arm of the WTR is lowered, and
wherein the MCU is configured to
analyze the vertical level to correct and signal process the magnetic flux density, or
to signal process the magnetic flux density and the vertical level.

* * * * *